(No Model.)
C. C. HENDERSON.
CORN AND SEED PLANTER.
No. 352,186. Patented Nov. 9, 1886.
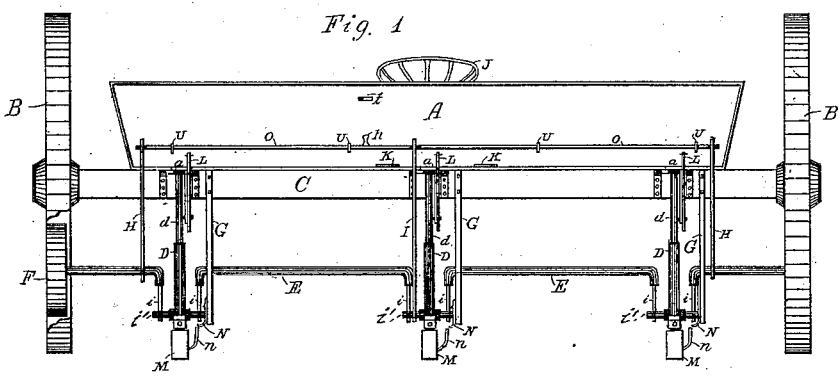
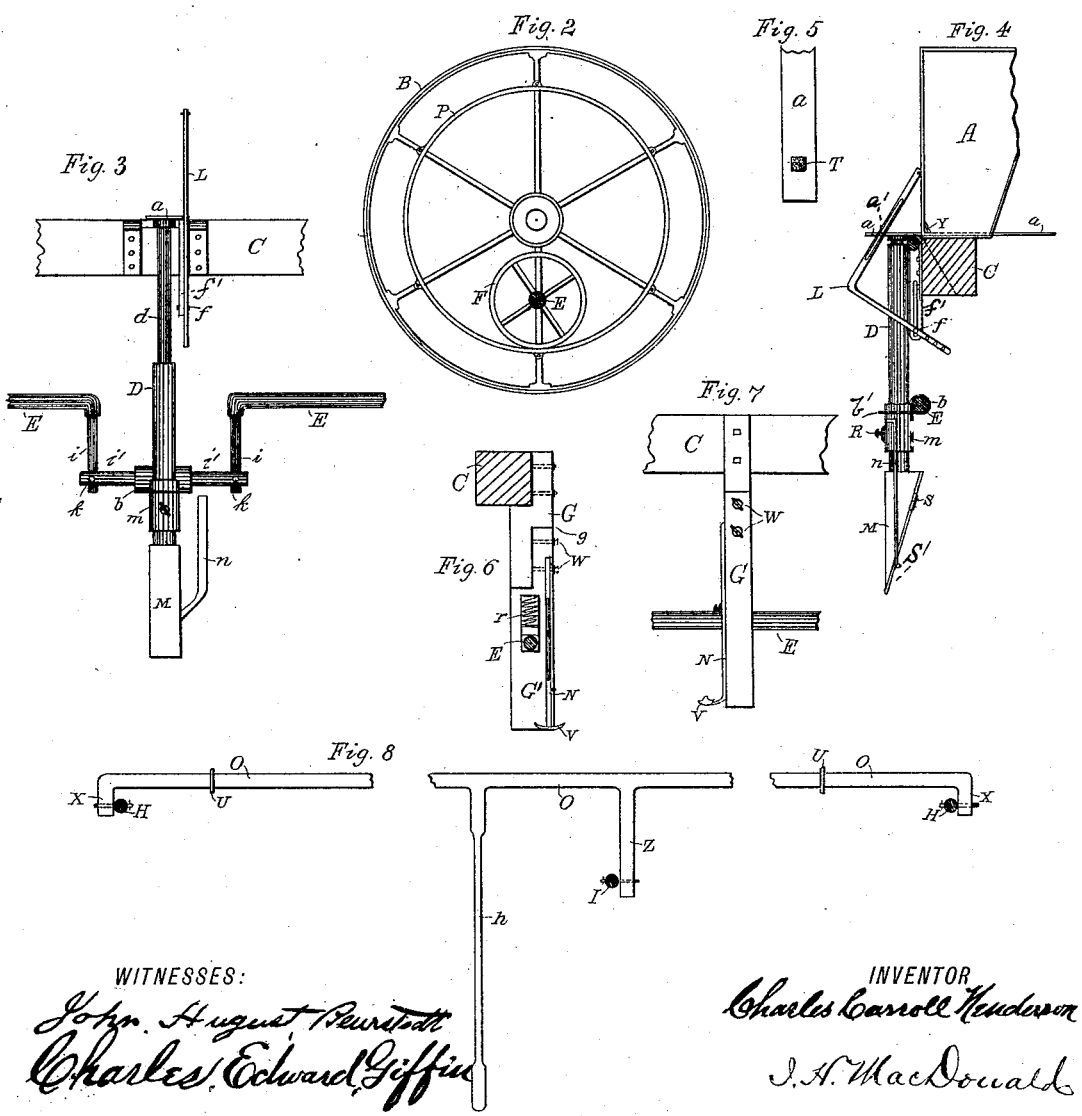
WITNESSES:
John August Beurstedt
Charles Edward Giffin
INVENTOR
Charles Carroll Henderson
J. A. MacDonald
ATTORNEY

UNITED STATES PATENT OFFICE.

CHARLES CARROLL HENDERSON, OF WARREN, PENNSYLVANIA.

CORN AND SEED PLANTER.

SPECIFICATION forming part of Letters Patent No. 352,186, dated November 9, 1886.

Application filed June 11, 1886. Serial No. 204,876. (No model.)

*To all whom it may concern:*

Be it known that I, CHARLES CARROLL HENDERSON, a citizen of the United States, residing at Warren, in the county of Warren and State of Pennsylvania, have invented a new and useful Corn and Seed Planting Machine, of which the following is a specification.

My invention relates to improvements in seed-planters, and has for its object to provide a device that will mark and space the ground uniformly, plant two or more rows at the same time, deposit the seed in any desired quantity in each hill, and place the seed in the ground to any desired depth. The mechanism for attaining these objects will be hereinafter more fully set forth in the specification, and pointed out in the accompanying drawings, in which—

Figure 1 is a front view of the seed-planter. Fig. 2 is a detail side view of one of the drive-wheels, showing the interior flange, and shaft-pulley resting and moving upon said flange; Fig. 3, a detail front view showing the seed-conductor and its connection with the main crank-shaft; Fig. 4, a detail side view of the seed-reservoir, slide-valve therein, valve-puller, telescopic seed-conductor, and valved planting-foot; Fig. 5, a plan view of seed-slide valve and seed-opening; Fig. 6, a side view of shaft-rest and valve-opening mechanism for planting-foot; Fig. 7, a front view of same, and Fig. 8 a plan view of lever for raising the planting devices.

Referring more particularly to the drawings, it will be seen that the device consists of a seed box or reservoir, A, supported upon an axle, C, of any desired length, (its front side being flush with the front of the axle,) depending simply upon the number of rows to be planted at one time. Each of the drive-wheels B has an interior and circumferential flange, P, to guide and support friction-wheel F, which imparts motion to the transverse crank-shaft E secured thereto. The crank-arms $i'$ on the cranks $i$ of shaft E are made adjustable on said cranks by means of set screws or bolts $k$, which pass through openings in each, as shown in Fig. 3. There will be as many of these crank-arms and cranks on shaft E as there are rows to be planted, and their operation will be explained hereinafter.

The seed-dropping mechanism consists of an automatic slide in the box A, a telescopic delivery-tube, and a valved planting-foot. In the bottom of box A a slide-valve, $a$, is placed and extends beyond the sides, and is slotted at its front end and connected to the puller L by means of a bolt, $a'$, working in a slot in the front end of the slide. An opening, T, permits the seed to pass from the slide to seed-conductors D, which deliver it into planting-shoes M. The puller L is made angular, as shown, and has its upper end pivoted to the front side of the box A by means of a staple, its lower end being secured to a strap, $f'$, by a bolt or pin, $f$. This strap $f'$ is secured to the upper end of the seed-conductor and swings in conjunction with the upper half of said conductor.

The seed-conductor consists of two parts. The upper part, $d$, is hinged to the front of the axle C, the axle having a groove cut in it, as shown in dotted lines, Fig. 4, to permit the conductor to swing back and forth. The lower portion, D, of the seed-conductor telescopes over the upper part, $d$, (which at its top is concaved to receive the seed,) and is secured to the crank-arm $i'$ by means of a cross-shaped clasp, the front part, $b'$, clasping the seed-conductor, and the rear part, $b$, encircling the crank-arm $i'$, and holds it sufficiently tight to permit the seed-conductor to move up and down and reciprocate with the reciprocal movement of the crank-arm.

A set-screw, $m$, tightens and holds the seed-conductor to the crank-arm after it has been determined what depth the planting-foot shall enter the ground. As the shaft E and crank-arm $i$ reciprocate, the lower part, D, of the delivery-tube moves up and down over the upper part, $d$, thus giving the telescopic movement before referred to.

The planting-foot consists of a wedge-shaped receptacle, M, on the lower end of tube D, and provided on its rear face with a door, S', hinged at S. A rod, $n$, is secured to the hinged door S' of foot M, and extends upward parallel to the plane of the conducting-tube. A strap, N, is adjustably secured to the side of shaft-rest G by means of a set-screw passing through a longitudinal slot in said strap, and can therefore be adjusted vertically to meet the upper end of rod $n$. The object of this is as follows: As the planting-foot and seed-conductors move forward they approach the vertical, and when they have reached their lowest point (the end of the foot being in the ground to its extreme depth) the upper end of rod n strikes the shoe v at end of slide N, which causes the rod n to swing forward slightly, carrying the door back, and thus opening the door and permitting the seed to escape. As soon as this full movement is completed and the conducting-tubes are moving back the rod passes from beneath the shoe, and the door is again closed by means of the spring contained within the chamber of the planting-foot and secured to said door. The shaft E and wheels F are held down upon the flange P of wheels B by means of suitable springs, r, in the boxing, thus preventing slipping of the wheels in their motion. The shaft-rests are made in two parts, G G', and made vertically adjustable by means of set-screws W, which pass through slots in the piece G', Fig. 6. A rod, O, extends across the front of the seed-box A, and is pivotally secured thereto by staples u, driven into the box. The ends of this rod are bent forward, forming bearings for rods H, which at their lower ends encircle the shaft E. A short arm, z, Fig. 8, is also bent forward, and has depending from it a chain, I, which is secured to the central crank-arm, i, to turn up said crank-arm at the same time the shaft is being raised, which is accomplished by means of the lifting hand-lever h, made integral with the shaft o. The distance between the rows is obtained by the distribution of the planters along the axle. Thus, if it is desired to have four feet between the rows, place the outside planters two feet from the center of tire of wheel B to the center of planting-foot M, the remaining ones will be placed four feet from center to center of said planting-feet. In this machine the wheels do their own marking, for as the machine is turned the outside wheel follows the track of the former inside wheel, and so on.

The complete operation of the device is as follows: As the wheels B move forward they cause the pulleys F to move by friction on the flange P, and as the shaft E is rigidly secured thereto this shaft commences to turn and reciprocate the crank-arms i'. This in turn causes the planting-feet and seed-conductors to be raised and moved forward, giving the spacing movement desired. Now, as these tubes move forward, the puller L attached thereto (and to the slide-valve a) moves forward, drawing out the valve and permitting the seed to drop into the delivery-tube D, and from thence in foot M; but as the tubes commence to reach the vertical the puller L and slide-valve a move back and are again ready to withdraw the seed. The tubes D and planting-feet move, when in the ground, practically in an oval arc; hence the point of foot M reaches the ground at the inner end of the longer axis, then passes into the ground and reaches its greatest depth at the lower end of the shorter axis, and then moves outwardly along the curve until the crank-arm moves up to its highest position, when the planting foot travels on nearly a straight line for four feet, and then again enters the ground, and this movement is continuous for all the planting-feet and their actuating mechanism. When the end of the field is reached, the driver simply lifts lever h up and back to the vertical, which in turn lifts the shaft E and crank-arms, through the intervention of rods H and chain I. When the turn has been made, the lever h is again thrown forward and the machine is again ready for action. It may be here stated that as the crank-arms i' rise the tubes D are carried up and telescope with d, and as the said arms descend the tubes D descend with them. But four valve-pullers are really needed, two at each end of the outer end valves. The remaining valves can be operated by a bar running across the ends and joined, as in a "gang" movement.

Having thus described my invention, what I claim as new, and desire to secure by Letters Patent, is—

1. In a seed-planter, the combination, with the driving-wheels provided with an internal circumferential flange, of pulley-wheels supported by and moving upon said flanges, said wheels actuating a shaft which imparts motion to the planting mechanism, as set forth.

2. In a seed-planter, the combination, with the internally-flanged driving-wheels and friction-pulleys supported by and moving thereon, of a crank-shaft provided with adjustable crank-arms, as set forth.

3. In a seed-planter, the combination, with the flanged driving-wheels, friction-pulleys, and crank-shaft having adjustable crank-arms, of seed-delivery tubes adjustably secured to said crank-arms, said tubes telescoping within each other, as set forth.

4. In a seed-planter, the combination, with the seed-reservoir and sliding valves in bottom thereof, of seed-delivery tubes, said tubes being of unequal diameter and moving one within the other, one part of said tubes being hinged to the axle, the other one adjustably secured to a crank-arm on the actuating-shaft, as set forth.

5. In a seed-planter, the combination, with the seed-reservoir and delivery-tubes, of a planting-shoe provided with a hinged door, said door having an arm projecting upward and adapted to engage with a shoe on a rod or strap adjustably secured to the shaft-bearings, whereby the door in said shoe is automatically opened and closed as the foot passes through the ground, substantially as set forth.

6. In a seed-planter, the combination, with the seed-box and delivery-tube, of a slide-valve in the seed-box, and a valve-puller secured to said valve and delivery-tube and pivotally secured to the seed-box, substantially as set forth.

7. In a seed-planter, the combination, with the seed-box and delivery-tubes, of the axle C, having front recesses to accommodate the backward movement of the delivery-tubes, as set forth.

8. In a seed-planter, the combination, with the seed-receptacle, delivery-tubes, and planting-feet provided with a door and arm extending upwardly therefrom, of a foot in the path of said arm, said foot being secured to an adjustable rod or strap attached to the shaft-bearings, whereby the movement of the delivery-tubes causes said arm to come in contact with said foot and open and close the doors, as set forth.

9. In a seed-planter, the combination, with the seed-receptacle, crank-shaft E, and its operating mechanism, of the shaft O, pivoted to the seed-box and provided with a hand-lever, the end rods secured thereto and to the crank-shaft, and the chains I, attached to shaft O, and the adjustable crank-arms, as set forth.

CHARLES CARROLL HENDERSON.

Witnesses:
JOHN AUGUST BEURSTEDT,
CHARLES EDWARD GIFFIN.